June 12, 1956  H. B. TOBIAS  2,750,141
COLLAPSIBLE STANDS FOR CAMERAS AND THE LIKE
Filed Nov. 3, 1952  2 Sheets-Sheet 2
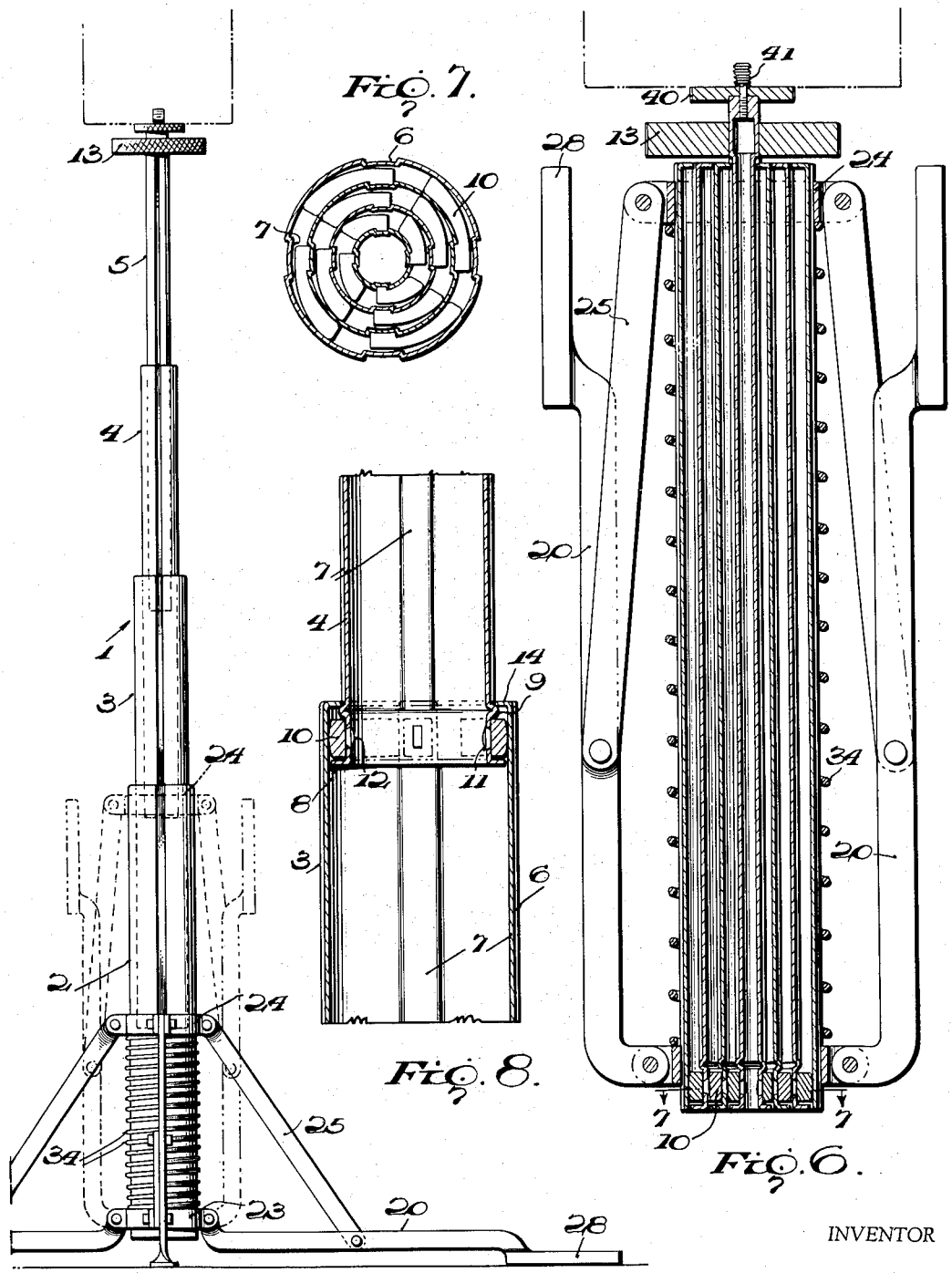
INVENTOR
H. B. Tobias.
BY
W. J. Eccleston.
ATTORNEY

United States Patent Office 2,750,141
Patented June 12, 1956

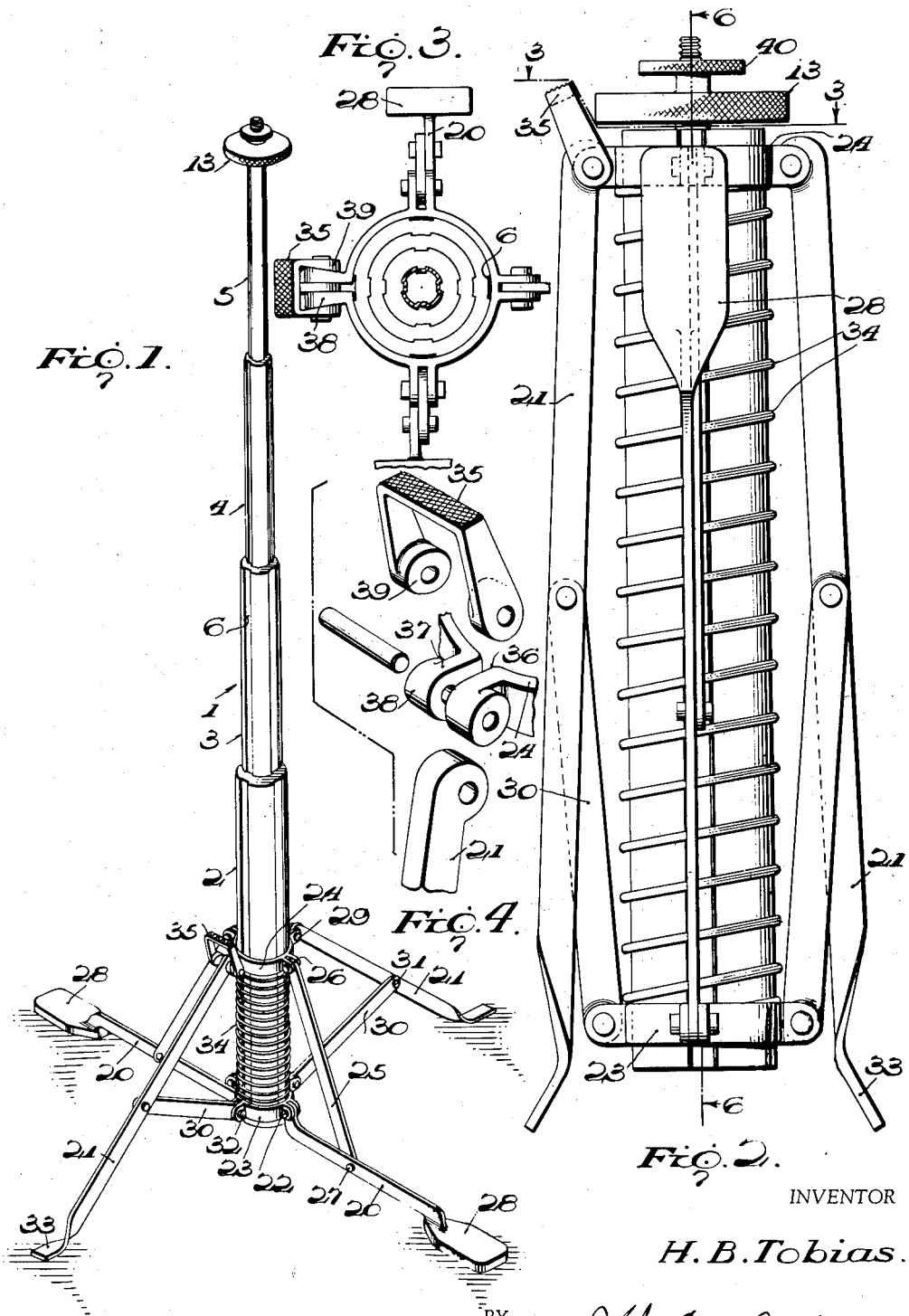

2,750,141
COLLAPSIBLE STANDS FOR CAMERAS AND THE LIKE

Herrmann B. Tobias, Washington, D. C.

Application November 3, 1952, Serial No. 318,538

3 Claims. (Cl. 248—161)

(Granted under Title 35, U. S. Code (1952), sec. 266)

The invention described herein, if patented, may be manufactured and used by or for the Government for governmental purposes, without the payment to me of any royalty thereon.

This invention relates to stands for supporting cameras and the like and has for its primary object to provide a stand which is readily collapsible and yet which is so designed as to provide a firm and rigid support for the mechanism mounted thereon.

Another object of the invention consists in the provision of a collapsible stand which can be set up with a minimum of time and effort.

A still further object of the invention resides in providing a stand which is rendered vertically adjustable by the use of telescopic sections and cams or wedges for locking the sections in adjusted positions by a simple rotary movement of the parts.

Other objects and advantages of the invention will be apparent from the following description when taken in connection with the accompanying drawings, in which:

Figure 1 is a perspective view of the collapsible stand set up and ready for use;

Figure 2 is a side elevational view of the stand in collapsible position;

Figure 3 is a sectional plan view taken on the line 3—3 of Figure 2;

Figure 4 is an exploded perspective view of the details of the clamp;

Figure 5 is a side elevational view, with parts broken away, of the stand ready for use and showing certain of the legs in both open and collapsed positions;

Figure 6 is a vertical sectional view through the stand in collapsed position;

Figure 7 is a horizontal sectional view taken on the line 7—7 of Figure 6; and,

Figure 8 is a fragmentary longitudinal sectional view through one of the joints of the telescopic post.

More specifically, the numeral 1 indicates the central post of the collapsible stand and comprises, in the present illustration, four cylindrical sections 2, 3, 4 and 5 of gradually diminishing diameters, so that they may be received one within the other as clearly indicated in Figure 1.

Each of the sections of the post 1 is provided with four external grooves 6 circumferentially spaced at 90° apart. These grooves 6 extend throughout the lengths of the sections and form internal ribs 7 for a purpose which will later appear. Each of sections 3, 4 and 5 of the post 1 is provided at its lower end with an outturned flange 8, and spaced slightly above the same is an outwardly directed rib 9 which together form a channel for the reception of four arcuate wedges 10 for each of the three sections just mentioned. The bases of the grooves 6, within the circular recess provided by the flange and bead 8—9, are provided with openings 11 which receive inward projections 12 formed on the smaller ends of the wedges 10.

The upper end of the post 1, that is, the section 5, has fixed at its upper end a knurled knob 13 which serves as means for manually rotating the various post sections relative to each other so as to carry the larger portions of the wedges 10 into contact with the internal ribs 7 of the various sections so as to lock the post in any of its possible adjusted elongations. It is to be noted that the internal ribs 7 extend throughout the lengths of the sections and that consequently the post 1 may be locked in an infinite number of adjusted lengths, and furthermore, that it is not necessary that each of the sections be extended the same distance beyond its adjacent section. In other words, instead of the sections being equally extended as shown in Figure 5, for instance, sections 3 and 4 could be fully extended while section 5 remains entirely inclosed within the section 4; but nevertheless, the sections withdrawn from the base 2 could be firmly locked against retrograde movement after the knob 13 is turned so as to bring the several wedges 10 into tight engagement with the internal longitudinally extending ribs of the several sections. It is to be noted, of course, that each of sections 2, 3 and 4 is provided at its upper ends with an internal flange 14 which serves to prevent complete disengagement of the sections from one another when drawn upwardly to extend the post.

As heretofore mentioned, the collapsible stand includes, in addition to the central post, a plurality of legs for firmly and quickly supporting the post in extended position for use. Moreover, the arrangement is such that by merely pulling downwardly on one of a pair of the legs or outwardly on a complementary pair of the legs, all the legs are brought into position for securely supporting the central post in upright position for use. More specifically, the support for the central post comprises two pairs of legs 20—20 and 21—21. The legs 20 are shown as pivoted at 22 to a fixed collar 23 at the bottom of the outer telescopic section 2 of the post, although it will be understood that, if desired, the legs could be pivoted to ears formed directly on the lower end of the section 2. Slidably mounted on the section 2 above the collar 23 is a collar 24, and pivoted to this collar are the upper ends of a pair of links 25, as indicated by the numeral 26. The lower ends of the links 25 are pivoted substantially midway of the lengths of the legs 20 as indicated by the numeral 27, and the free ends of the legs 20 are provided with flat stabilizing plates or the like 28 which serve to flatly engage the ground or other base on which the collapsible stand may be mounted. Also these plates 28 provide flat surfaces on which the feet of the photographer or other person using the stand may be placed so as to not only rigidly secure the stand in position but also to prevent it from being inadvertently upset.

The legs 20 are diametrically opposed and the second pair of legs 21—21 are pivoted to the slidable collar 24 as indicated by the numeral 29 and are spaced 90° from the legs 20—20. Links 30 are pivoted to the legs 21 intermediate the ends thereof as indicated by the numeral 31, and the opposite ends of the links 30 are pivoted to the fixed collar 23 as indicated by the numeral 32. The lower or free ends of the legs 21 are provided with outwardly bent feet 33 so as to provide a substantial contact with the ground or other surface on which the stand is mounted.

Normally the legs 20—21 are in collapsed position just as the post 1 is in collapsed position, as indicated in Figure 2 of the present drawing. In order to normally maintain the legs in collapsed position as just referred to, a coil spring 34 encircles the lower portion of the outer section 2 and has its lower end in engagement with the fixed collar 23 and its upper end in engagement with the slidable collar 24, so that normally the collar is moved upwardly to its extended position as shown in Figure 2, thereby drawing the legs into collapsed position as indicated in the various figures of the drawing. In order to secure the slidable collar 24 and consequently the legs associated therewith in the one position or the other a clamp lever 35 is provided, and the collar 24 is split as indicated by the numeral 36. Ears 37 are provided on the free ends of the collar 24 and have formed thereon cam surfaces 38 which are adapted to cooperate with cam surfaces 39 on the lever 35 so as to cause the collar 24 to tightly grip the external surface of the section 2 when the lever 35 is swung downwardly, and to release such pressure when the lever is swung upwardly as indicated in Figure 2.

For the purpose of attaching a camera or other instrument to the stand, as heretofore described, a knurled disk 40 is swiveled to the upper end of the telescopic section 5 and is provided with a screw 41 for connection with such instrument.

From the foregoing description taken in connection with the attached drawings, it will be apparent to those skilled in the art that I have devised an exceedingly simple, yet durable construction of collapsible stand for cameras and the like, in which a central post is employed as the support for the camera or other instrument; that this central post may be extended and secured in such extended position by a simple upward pull and a circular turn on the knob 13; that the central post may be supported in its vertical position by merely giving a downward pull on one of the legs 20 or an outward pull on one of the legs 21; that the legs 20—21 may be firmly secured in either their operative or inoperative position by operation of the lever 35, and that the central post 1 may be secured in its collapsed position by rotating the knob 13 to bring the wedges 10 into cooperation with the internal ribs 7.

In accordance with the patent statutes, I have described what I now consider to be the preferred form of the invention, but inasmuch as various minor changes may be made in structural details, it is intended that all such changes be included within the scope of the appended claims.

I claim:

1. A collapsible stand for cameras and the like, comprising a central post and a plurality of foldable legs on the lower end thereof, said post including a plurality of telescopic sections, and means for securing said sections in various adjusted positions, said means including a plurality of interior longitudinal ribs formed in said sections and extending lengthwise thereof, arcuate wedges mounted on the exterior of certain of said sections for cooperation with said ribs, and a hand grip on the upper of said sections to facilitate the relative rotation of the sections to cause the wedges to tightly engage said ribs.

2. In a post comprising a plurality of telescopic sections, means for securing said sections in various adjusted positions, said means including an exterior longitudinal groove formed in each section and providing an internal longitudinal rib, all but the largest of said sections provided with exterior annular grooves adjacent their lower ends, an arcuate wedge mounted in each annular groove and having a portion anchored in the exterior longitudinal groove of such section, and means for rotating said sections to bring the arcuate wedges into engagement with said longitudinal ribs.

3. A collapsible stand for cameras and the like, comprising a central post formed of a plurality of telescopic sections, a collar slidably mounted thereon, a second collar fixed to the lower end of the post, a first pair of diametrically opposed legs having their uper ends pivoted to said slidable collar, a pair of links pivotally connected at one of their ends to said legs intermediate the ends thereof, the opposite ends of the links being pivotally connected to the fixed collar, a second pair of diametrically opposed legs pivoted to the fixed collar and equally spaced between said links, stabilizing plates fixed to the free ends of the second pair of legs, a second pair of links pivoted at one of their ends to said slidable collar and having their opposite ends pivoted to said second pair of legs intermediate their ends, a compression spring encircling the lower end of the post and having its upper end in engagement with said slidable collar and its lower end seated on the fixed collar for normally maintaining said legs in collapsed position, and means for locking said slidable collar either in position with said first pair of legs arranged at an acute angle to the central post and said second pair of legs arranged at substantially right angles to said post or with the legs in collapsed position.

References Cited in the file of this patent

UNITED STATES PATENTS

| | | |
|---|---|---|
| 744,386 | Norton | Nov. 17, 1903 |
| 1,107,075 | Karges | Aug. 11, 1914 |
| 1,258,518 | Ankovitz | Mar. 5, 1918 |
| 1,364,169 | Wolff | Jan. 4, 1921 |
| 1,510,272 | Harmount | Sept. 30, 1924 |
| 2,361,781 | Lindsey et al. | Oct. 31, 1944 |
| 2,476,216 | Polleau | July 12, 1949 |
| 2,526,415 | Refsdal | Oct. 17, 1950 |

FOREIGN PATENTS

| | | |
|---|---|---|
| 1,716 | Great Britain | Jan. 22, 1897 |
| 405,925 | France | Nov. 26, 1909 |